(12) United States Patent
Barnhardt

(10) Patent No.: US 6,877,207 B1
(45) Date of Patent: Apr. 12, 2005

(54) METHODS OF MANUFACTURE BRAKE ROTORS

(76) Inventor: Keith F. Barnhardt, 6941 Bender Rd., Bloomington, IN (US) 47401

( * ) Notice: Subject to any disclaimer, the term of this patent is extended or adjusted under 35 U.S.C. 154(b) by 44 days.

(21) Appl. No.: 10/395,634

(22) Filed: Mar. 24, 2003

(51) Int. Cl.$^7$ ................................................. B23P 13/04
(52) U.S. Cl. ........................................... 29/558; 29/557
(58) Field of Search .................. 29/558, 557; 188/218, 188/18 A, 73.35

(56) References Cited

U.S. PATENT DOCUMENTS

| | | |
|---|---|---|
| 2,621,762 A | 12/1952 | Bachman |
| 3,786,904 A | 1/1974 | Hotchkiss |
| 3,907,076 A | 9/1975 | Crossman et al. |
| 4,055,236 A | 10/1977 | Dowell |
| 4,108,286 A | 8/1978 | Gagarin |
| 4,286,694 A | 9/1981 | Wiseman, Jr. et al. |
| 4,967,890 A | 11/1990 | Landa et al. |
| 5,480,007 A | 1/1996 | Hartford |
| 5,626,211 A | 5/1997 | Gewelber et al. |
| 5,713,450 A | 2/1998 | Quigley |
| 5,779,006 A | 7/1998 | Hyde et al. |
| 5,899,305 A | 5/1999 | Austin et al. |
| 5,915,747 A | 6/1999 | Dickerson et al. |
| 5,937,499 A | 8/1999 | Austin et al. |
| 6,059,374 A | 5/2000 | Goddard |
| 6,131,707 A | 10/2000 | Beuchel et al. |
| 6,135,248 A | 10/2000 | Johnson et al. |
| 6,152,270 A | 11/2000 | Giorgetti |
| 6,164,423 A | 12/2000 | Dickerson |
| 6,241,055 B1 | 6/2001 | Daudi |
| 6,267,210 B1 | 7/2001 | Burgoon et al. |
| 6,273,223 B1 | 8/2001 | Aloy |
| 2001/0040077 A1 | 11/2001 | Qian et al. |

FOREIGN PATENT DOCUMENTS

JP 356141757 * 11/1981

OTHER PUBLICATIONS

Sales Catalogue, Dan Press Industries (date unknown).
Sales Catalogue, The Brake Man, Inc.™ (2000).

* cited by examiner

Primary Examiner—John C. Hong
(74) Attorney, Agent, or Firm—Woodard, Emhardt, Moriarty, McNett & Henry LLP

(57) ABSTRACT

Internally slotted brake rotors and method for producing the same wherein a brake rotor is machined from a unitary piece of material and includes at least one internal slot. In one aspect of the invention, a cutting blade is used to machine a plurality of segmented-circular shaped internal slots that are circumferentially distributed about the outer edge of the rotor. In an alternate arrangement a cutting blade is used to machine a single circumferential groove about the outer edge of a rotor.

26 Claims, 14 Drawing Sheets

METHODS OF MANUFACTURE BRAKE ROTORS

FIELD OF THE INVENTION

The present invention relates generally to disk brake rotors and more particularly to disk brake rotors having one or more internal slots machined circumferentially into a single piece of material, and methods of producing same.

BACKGROUND OF THE INVENTION

Rotors for disk brake applications are well known in the art. Braking systems utilizing rotors operate by application of a compressive force upon opposing surfaces of the rotor, typically by brake pads, which results in the generation of friction between the pads and the rotor. This friction acts to slow the rate of rotation of the rotor, and thereby of the wheel to which it is fixed, such as, for example, a wheel of an automobile. In the case of an automobile, application of the compressive force ultimately converts the kinetic energy of the automobile into thermal energy as the automobile is slowed by the friction. It is readily understood that materials used to fabricate rotors must exhibit suitable strength to withstand the compressive forces, frictional forces, and the resulting torque, to which the rotor is exposed, and must have a high capacity to dissipate the thermal energy generated by friction during braking. An additional property that is important in some applications, such as, for example, when the rotor is used in a racecar, is the weight of the rotor. A desirable rotor for racing applications provides suitable slowing ability without adding substantially to the total weight of the vehicle.

While the properties of strength, heat dissipation and weight are all important to brake rotor design, it is appreciated that certain desirable features are often compromised in designs where other properties are improved. One important aspect of rotor design and manufacture that bears upon these properties is the selection of the material from which the rotor is made. For example, materials such as stainless steel have excellent strength characteristics, but are relatively heavy, indeed unacceptably heavy for many applications. The use of aluminum alloy materials enables construction of a lighter weight rotor without compromising thermal conductivity, but the use of aluminum compromises strength compared to steel. Titanium alloys combine high strength and low weight but exhibit lower heat conductivity compared to steel and aluminum.

One process described in the prior art for the manufacture of rotors includes casting of a material in a rough form, followed by finishing of surfaces to provide a finished rotor. In casting processes described in the art, rotors are typically made from ferrous alloys which are cast into a desired shape and machined in multiple operations into a finished rotor. Casting processes have also been described in which rotors are made using composite materials such as carbon fiber. Casting does make it possible to incorporate internal cooling features such as fins into the rotor's design which improves the rotor's heat dissipation properties and decreases the weight of the rotor; however, cast rotors made from ferrous alloys are relatively heavy, and are therefore not well suited for many applications.

In other fabrication processes described in the art, rotors are fabricated using multiple layers of material, typically metal, which are then fused or otherwise joined together into the final desired structure. The different layers of the rotor may be made from different materials such as steel, titanium and aluminum alloys in an effort to achieve a combination of properties desired. This method allows for rotors having more complex internal cooling features such as those shown in U.S. Pat. No. 5,626,211 to Gewelber et al.; however, it is believed that this method of manufacture has not gained widespread appeal because it involves many steps leading to high production costs and an increased incidence of defects in the rotor.

In another manner of making rotors, rotors are machined from a solid billet of material. Machined rotors known in the art include cooling features cut in the friction surface of the rotor, such as, for example, cross-drilled holes passing through the friction surface of the rotor and surface slots cut in the friction surface. Cross-drilled holes and friction surface slots are two examples of features that decrease the weight of the rotor as well as increase its cooling capacity; however, this approach decreases the available surface area for generating friction between the rotor and brake pads, thereby reducing the overall braking efficiency of the rotor.

There is a continuing need for brake rotors that are lightweight and possess high strength and high heat-dissipation capacity, and methods for making same, particularly for use in many high speed and heavy braking applications. This is particularly true in racing applications such as NASCAR and in sprint racing where a single rotor, the rear left, often bears most of the burden during braking. The present invention addresses this need.

SUMMARY OF INVENTION

The invention is set forth in the claims below, and the following is not in any way to limit, define or otherwise establish the scope of legal protection. In general terms, the present invention relates to methods of manufacturing disk brake rotors having at least one internal slot formed in the outer circumferential wall of the rotor. The internal slot is defined by an inner wall and two side walls which are integrally formed with the outer wall of the rotor.

One object of the present invention is to provide methods for making brake rotors having circumferentially machined internal cooling slots.

Another object of the invention is to provide a disk brake rotor having a plurality of segmented-circular shaped internal slots equally distributed about the outer circumference of the rotor.

Yet another object of the present invention is to provide a disk brake rotor having a continuous internal slot formed in the outer circumferential wall of the rotor about the entire circumference of the rotor.

Further objects, embodiments, forms, benefits, aspects, features and advantages of the present invention may be obtained from the description, drawings, and claims provided herein.

DESCRIPTION OF PREFERRED EMBODIMENTS

Figure 1:
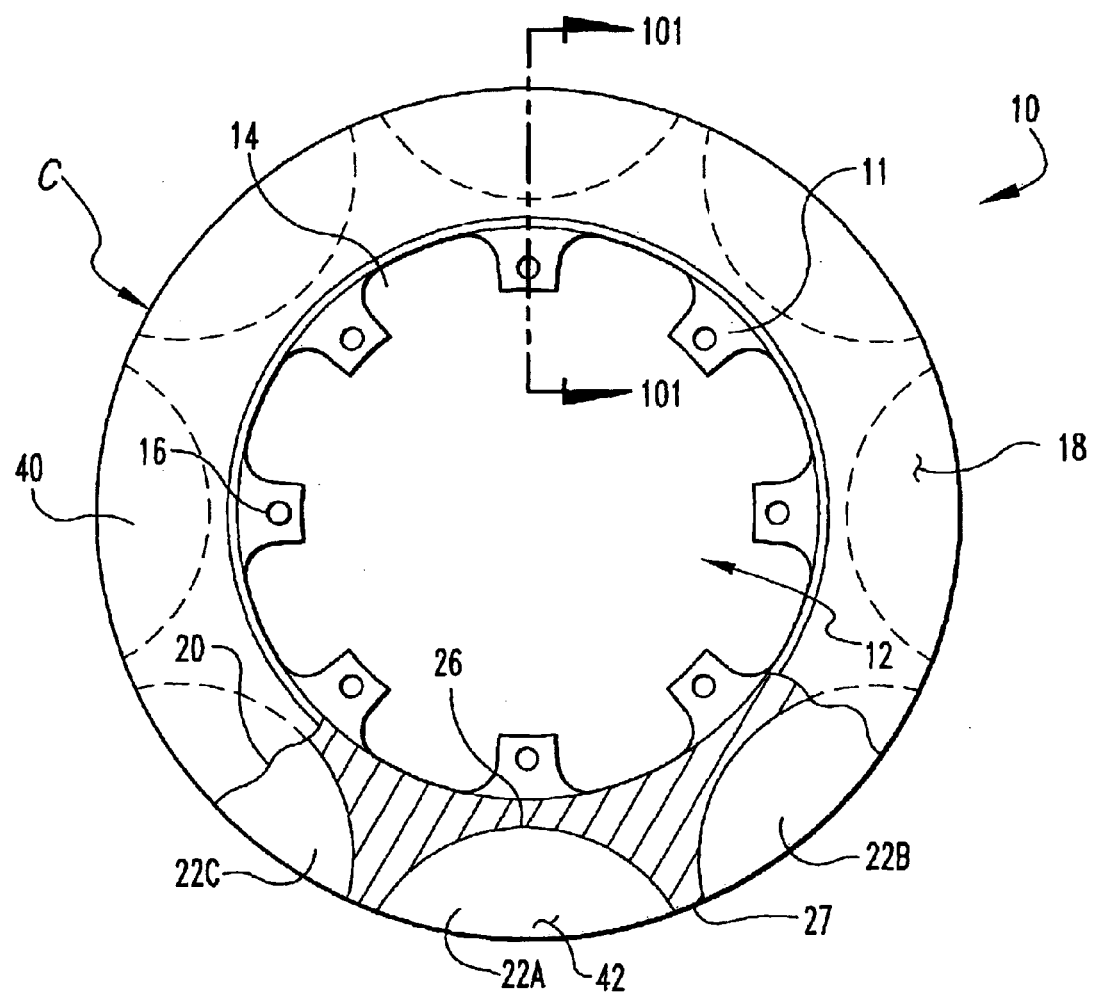
FIG. 1 is a partial sectional, cut away plan view of a brake rotor according to one embodiment of the present invention.

For the purposes of promoting understanding of the principles of the invention, reference will now be made to the embodiment illustrated in the drawings and specific language will be used to describe the same. It will nevertheless be understood that no limitation of the scope of the invention is hereby intended and alterations and modifications in the illustrated device, and further applications of the principles of the present invention as illustrated herein being contemplated as would normally occur to one skilled in the art to which the invention relates.

Referring to the drawings, FIG. 1 shows a partial sectional plan view of an internally slotted rotor in accordance with the present invention having a partial cut away section 20. The rotor 10 includes a radial inner hub 14 having a mounting face 11 for mounting the rotor 10 on an associated drive member such as an axle (not shown). For purposes of describing the present invention, the term "inner hub" is used to refer to the portion of a rotor oriented inward from the friction portion of the rotor and configured for attachment to an associated drive member. In various embodiments depicted in the drawings, the inner hub comprises a plurality of lugs; however, this configuration can be modified in a wide variety of ways without departing from the spirit and scope of the present invention. Central mounting face 11 of inner hub 14 of the rotor depicted in FIG. 1 includes a central pilot aperture 12 in which the associated drive member may be received and a plurality of circumferentially spaced fastener apertures 16 in which fasteners such as bolts (not shown) may be received to mount the rotor on the associated drive shaft. FIG. 1 shows a brake rotor having eight lugs into which eight fastener apertures 16 are machined While a variety of preferred embodiments having eight fastener apertures are described herein and depicted in the drawings, it is understood that the present invention is not limited to rotors having a certain number of fastener apertures, but rather contemplates rotors having a greater or lesser number fastener apertures as desired for a particular application.

Figure 2:
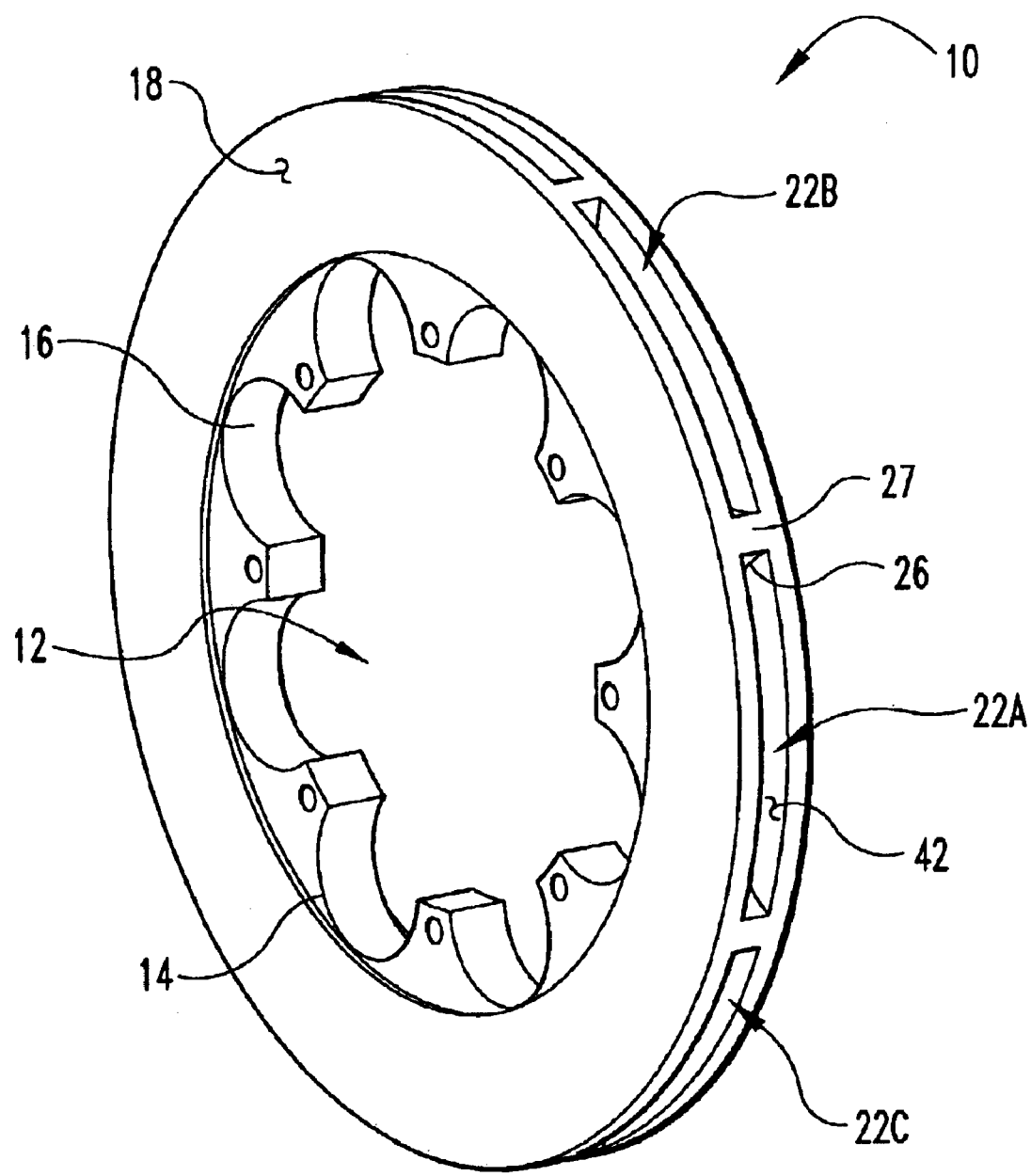
FIG. 2 is a perspective view of the brake rotor of FIG. 1.
Figure 2A:
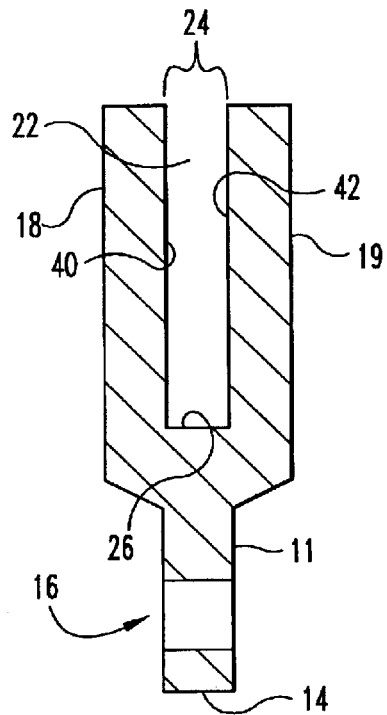
FIG. 2A is a partial cross sectional view of the rotor of FIG. 1 along line 101.

The rotor 10 also includes two outer friction portions 18, which is shown in FIG. 1, and 19, which is depicted in the partial cross sectional view set forth in FIG. 2A. The outer friction portions are designed and adapted to interface with associated friction members such as brake pads (not shown). Although the outer friction portions 18 and 19 are shown as featureless, it is understood that the outer friction portions may include surface features such as friction surface slots or cross-drilled holes to improve heat dissipation properties of the rotor. In embodiments including such surface features, the surface features are used with the understanding that they decrease the available surface area upon which the associated friction members can act, thus reducing the slowing efficiency of the braking system. One advantage of the present invention is that it provides internal slots, thus reducing or eliminating the need for slots, grooves, holes or the like in the rotor's friction surfaces; however, the invention is readily useable in combination with such friction surface features, and such combination is expressly contemplated by the invention.

In the partial cut away section 20 of FIG. 1 a section of outer friction portion 18 has been removed to show internal features in the form of internal slots 22A, 22B, 22C (three of a plurality shown and collectively designated "internal slots"). In this embodiment the internal slots have a segmented-circular shape. As shown more fully in FIGS. 2 and 2A, each internal slot is defined by an inner wall 26, two side walls 40, 42 and opening 24. The inner wall 26 and side walls 40, 42 are integrally formed with one another and with the outer friction portions 18, 19 of rotor 10. Each internal slot fluidly communicates with the rotor's external environment through openings 24. Preferably, the internal slots 22 are equally spaced about the periphery of the rotor. In the embodiment depicted in FIG. 1, the internal slots are isolated from one another, with circumferentially spaced apart walls 27 separating one internal slot from the next internal slot. FIG. 2 shows a side perspective view of rotor 10 according to the embodiment of the present invention illustrated in FIG. 1.

A prototype rotor having the configuration depicted in FIGS. 1, 2 and 2A was made from an aluminum workpiece having an outside diameter of 12.2 inches and a thickness of 0.630 inches. After the lugs were machined and the bolt holes drilled in the lugs, as shown in FIG. 1, the rotor workpiece weighed 3.79 pounds. After forming eight internal slots as shown in FIG. 1 with a 6-inch cutting tool to a depth of 1.50 inches and a width of 0.25 inches, the workpiece weighed 2.89 pounds. Using the same cutting tool the internal slots were then enlarged to a depth of 1.63 inches which decreased the weight of the workpiece to 2.79 pounds. The internal slots were then once again enlarged using the same cutting tool to a depth of 2.00 inches. At a depth of 2.00 inches, the deepest portion of the internal slots became externally visible in the axial direction in the lugs of the rotor in a manner similar to that shown in FIG. 5. The final workpiece having eight, 2-inch internal slots weighed 2.41 pounds.

In a preferred embodiment, such as that shown in FIG. 1, the center of each internal slot is aligned with the center of a corresponding fastener aperture. This alignment is believed to provide optimal internal strength of the rotor, thus allowing the rotor to better withstand the torque experienced by the rotor during braking. This alignment also evenly distributes the weight of the rotor about the circumference of the rotor. These properties are particularly important in brake rotors used in high speed, heavy braking environments such as racing.

Figure 2B:
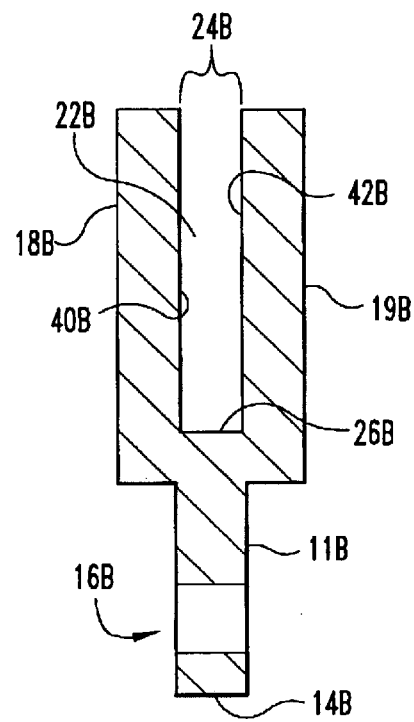
FIG. 2B is a partial cross sectional view of an alternate embodiment of the rotor of FIG. 1 along line 101.
Figure 2C:
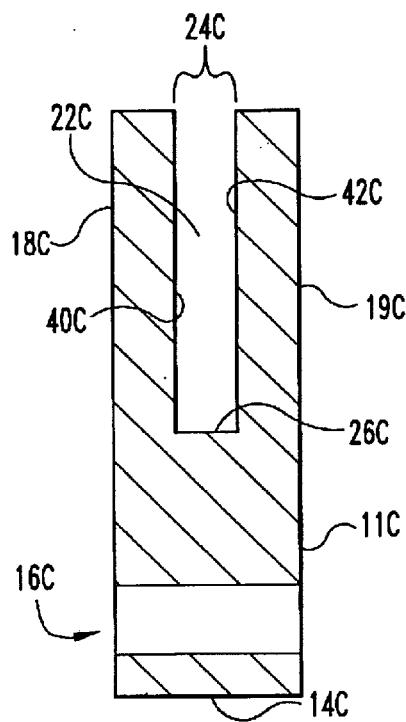
FIG. 2C is a partial cross sectional view of yet another alternate embodiment of the rotor of FIG. 1 along line 101.
Figure 2D:
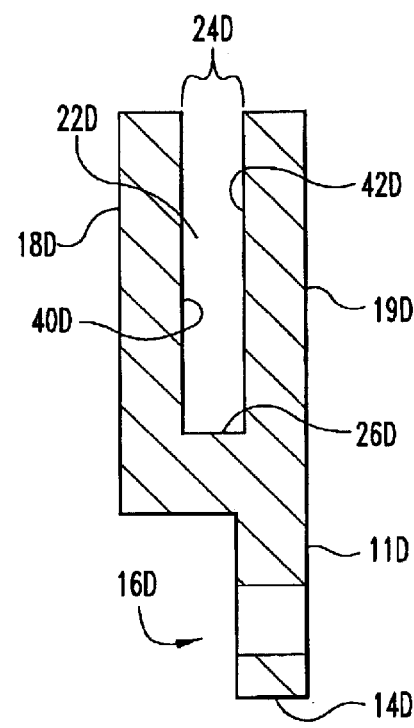
FIG. 2D is a partial cross sectional view of still another alternate embodiment of the rotor of FIG. 1 along line 101.

FIG. 2A shows a partial cross-sectional view of the rotor shown in FIG. 1 along line 101. This view best illustrates the relationship between the side walls 40, 42, the inner wall 26 and the opening 24 as they define internal slot 22. The partial cross-section of an alternative embodiment of the rotor shown in FIG. 1 taken along line 101 is shown in FIG. 2B. In this embodiment, a different cross-section is created by using alternative machining steps when forming the central mounting face 11B of the inner hub 14B of the rotor. The view also shows the relationship between the side walls 40B, 42B, the inner wall 26B and the opening 24B as they define the internal slot 22B. As will be appreciated by a person of ordinary skill in the art, if friction surfaces 18B, 19B and other rotor dimensions are the same as friction surfaces 18, 19 and other dimensions of the embodiment shown in FIG. 2A, the embodiment shown in FIG. 2B will be lighter in weight than the embodiment shown in FIG. 2A by virtue of the right angle configuration of the surface between the friction surface and the inner hub. FIG. 2C shows a partial cross-section of yet another embodiment of the rotor show in FIG. 1 taken along line 101. In this embodiment, minimal machining of the initial rotor workpiece was performed to produce the central mounting face 11 C of the inner hub 14C. Thus, the lug in this embodiment has a width that is substantially the same as the width of the rotor portion that is engaged by brake pads. The internal slot 22C in the embodiment shown in FIG. 2C is defined by two side walls 40C, 42C, an inner wall 26C and an opening 24C. Yet another alternative embodiment of the rotor shown in FIG. 1 taken along line 101 is shown in FIG. 2D. In this embodiment the hub is machined such that the inner hub 14D is offset with respect to internal slot 22D. The internal slot 22D in this embodiment is defined by two side walls 40D, 42D, an inner wall 26D and an opening 24D. As further alternatives to the embodiment shown in FIG. 2D, alternative machining steps can be used to provide a tapered surface from friction surface 18D to inner hub 14D in a manner similar to the tapered surfaces shown in FIG. 2A. It is of course understood that FIGS. 2A-D are provided as non-limiting examples, it being understood that the present invention is contemplated for use in a wide variety of rotor designs, including rotors having inner hubs of a variety of widths and configurations.

Figure 3:
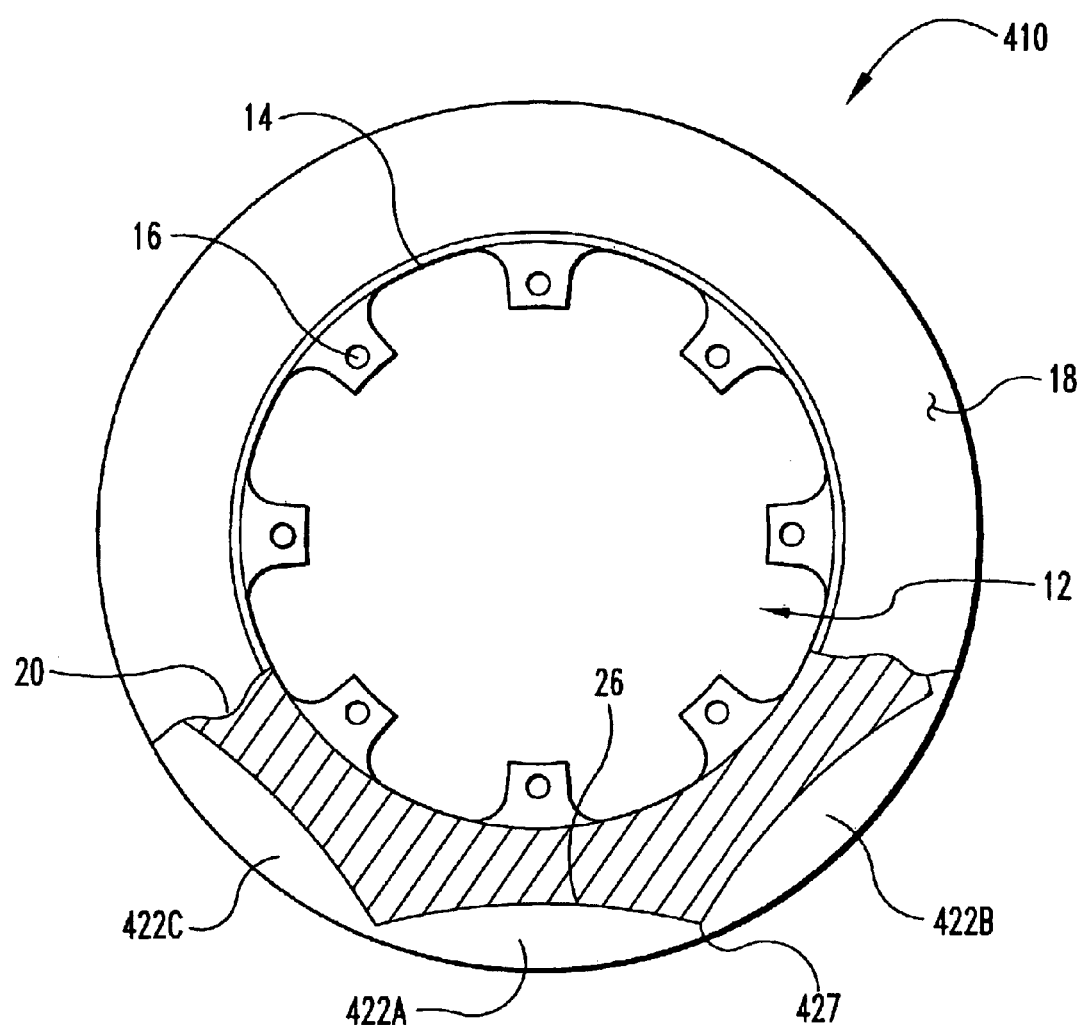
FIG. 3 is a partial sectional, cut away plan view of a brake rotor according to another embodiment of the present invention.
Figure 4:
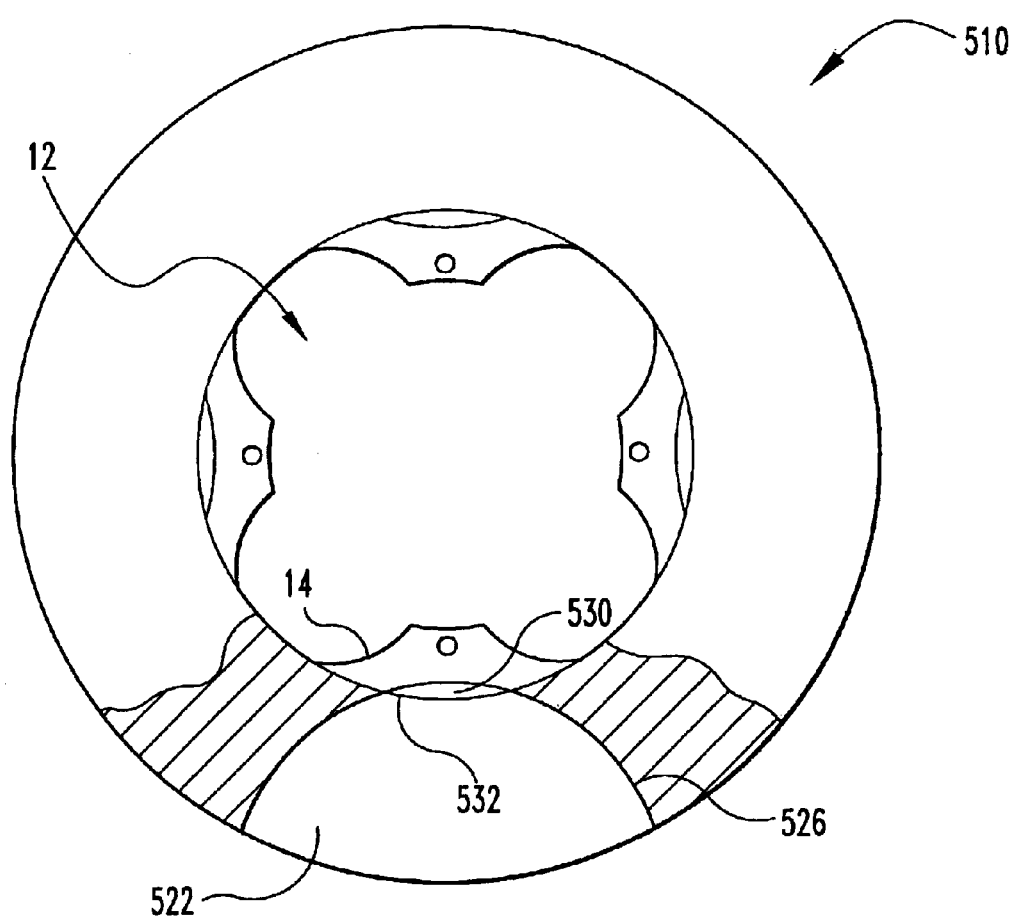
FIG. 4 is a partial sectional, cut away plan view of a brake rotor according to yet another embodiment of the present invention.

The distance between individual slots (i.e., the width of walls 27 in FIG. 1) may also be varied as desired. In an alternate embodiment, as depicted in FIG. 3, the distance between individual internal slots in rotor 410 may be reduced to zero such that the inner wall 26 of one slot meets the inner wall 26 of an adjacent slot at an internal point inside rotor circumference C. In this embodiment, internal slots 422A, 422B, 422C overlap to create internal, spaced apart peaks 427. This can be accomplished, for example, by increasing the diameter of the cutting tool used to cut the internal slots. As seen in FIG. 4, the depth of the individual internal slots may be increased such that a portion 530 of the internal slot 522 extends into a portion of the inner hub 14 of rotor 510. In the embodiment shown in FIG. 4, hub 14 has a width that is the same as or less than the width of the internal slot 522. This configuration provides slot 522 having outer opening 524 open to the outer wall of the rotor, an inner wall 526 and an inner opening 532 open to the central pilot aperture 12. Providing an inner opening 532 and an outer opening 524 allows for air circulation through the body of the rotor thereby improving the heat dissipation properties of the rotor. The present invention contemplates internal slots have a wide variety of dimensions, i.e., slots that are machined using cutting tools of different diameters, thereby providing different slot arc dimensions, and that are machined to different depths. It is not intended that the invention be limited to internal slots having the particular dimensions described herein. Alternate embodiments having a different number, size, and configuration of internal slots are contemplated by the invention, a variety of which are discussed in the following paragraphs.

Figure 5:
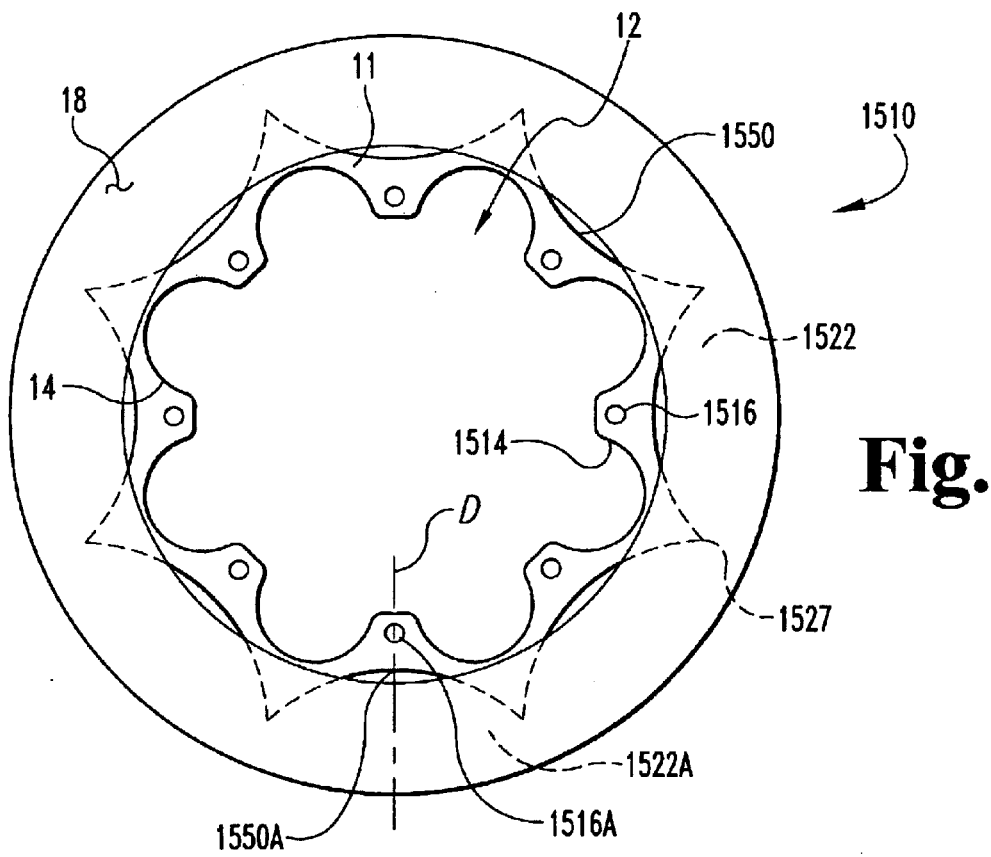
FIG. 5 is a top plan view of another embodiment of the present invention.
Figure 6:
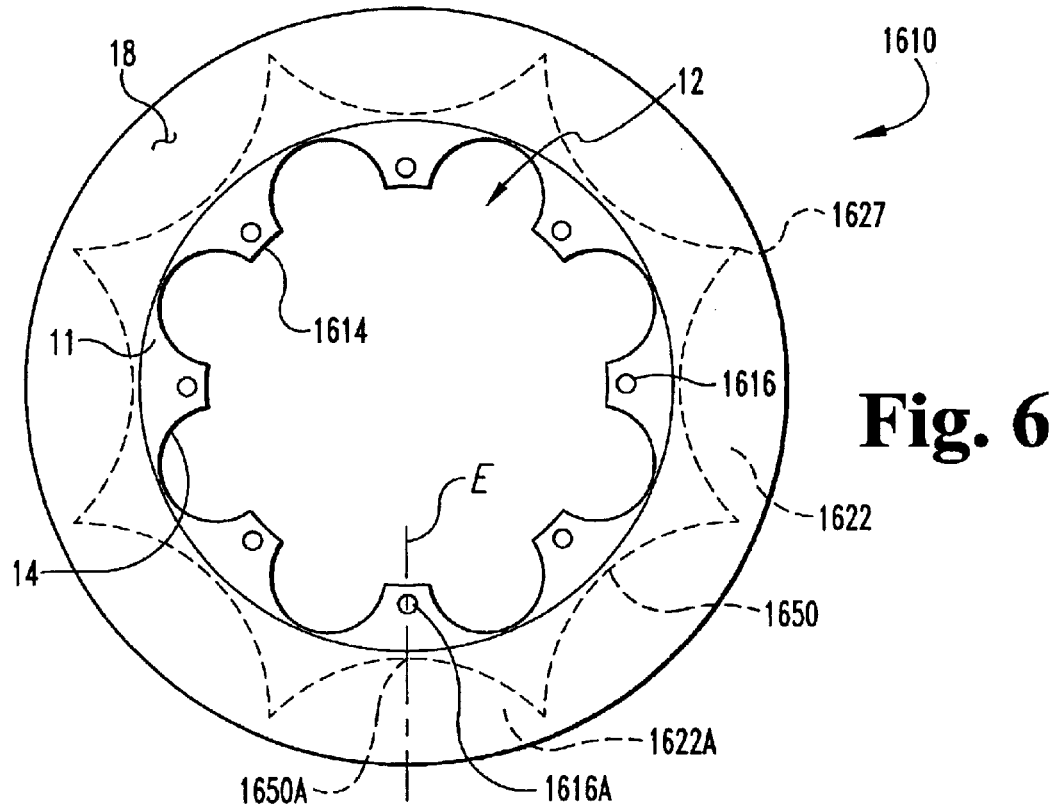
FIG. 6 is a top plan view of an additional embodiment of the present invention.

FIGS. 5 and 6 show further examples of rotors according to the present invention where the center of each internal slot is aligned with a corresponding fastener aperture. The rotor 1510 shown in FIG. 5 includes eight fastener apertures 1516 and eight internal slots 1522. In this example, a portion of each slot extends into a portion of the lug 1514, which is expected to have the additional advantage of allowing air to pass through the body of the rotor, as described above. The plurality of internal slots 1522 are separated by circumferentially spaced peaks 1527 and the center of each slot is aligned with a corresponding fastener aperture such as the center 1550A of internal slot 1522A is aligned with fastener aperture 1516A along line D. A prototype rotor having the configuration depicted in FIG. 5 was made from an aluminum workpiece having an outside diameter of 12.2 inches and a thickness of 0.625 inches. Eight internal slots were machined into the workpiece as shown in FIG. 5 with a inch cutting tool to a width of 0.250 inches and a depth of 2.00 inches.

FIG. 6 shows a similar example of a rotor 1610 to that shown in FIG. 5, however, in this example the plurality of internal slots 1622 do not extend into the body of the mounting lug 1614. The plurality of internal slots 1622 are separated by peaks 1627 and the center of each slot is aligned with a corresponding fastener aperture. For example, the center 1650A of slot 1622A is aligned with fastener aperture 1616A along line E. A prototype rotor having the configuration depicted in FIG. 6 was made from an aluminum workpiece having an outside diameter of 12.2 inches and a thickness of 0.625 inches. Eight internal slots were machined into the workpiece as shown in FIG. 6 with a 6-inch cutting tool to a width of 0.250 inches and a depth of 1.625 inches.

Figure 7:
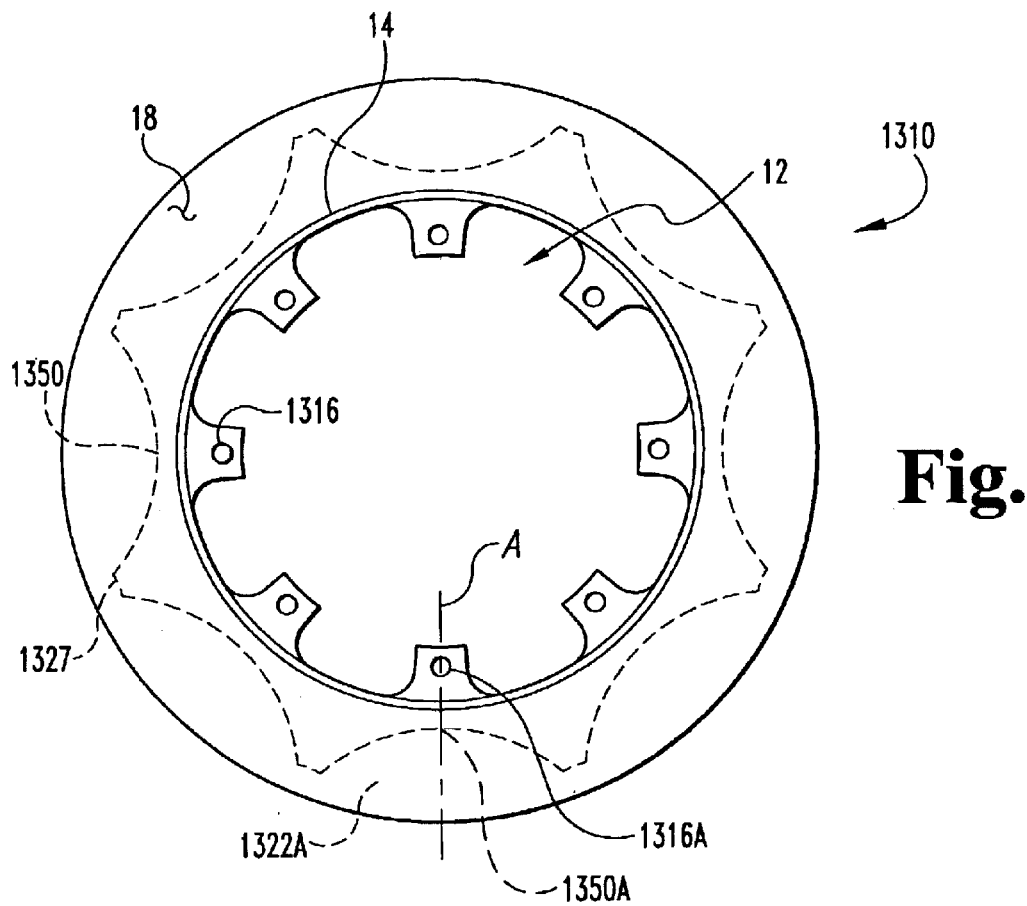
FIG. 7 is a top plan view of yet another embodiment of the present invention.

FIG. 7 depicts another embodiment of the present invention having a plurality of segmented-circular internal slots 1322 separated by spaced apart blunted internal peaks 1327. This particular example depicts a rotor having eight fastener apertures 16 and eight internal slots 1322. The center 1350 of each slot 1322 is aligned with the center of a corresponding fastener aperture 1316. As seen in FIG. 7, the center of internal slot 1322A is aligned with fastener aperture 1316A along line A. This alignment increases the internal strength of the rotor and evenly distributes the weight of the rotor about its circumference. As previously discussed, this is particularly important in rotors used in high speed and heavy braking environments such as racing.

A prototype rotor having the configuration depicted in FIG. 7 was made from a titanium workpiece having a diameter of 12 inches and a thickness of 0.375 inches. Eight internal slots were machined into the workpiece as shown in FIG. 7 with a 6-inch diameter cutting tool to a width of 0.170 inches and a depth of 1.563 inches. After the slots were formed, the cutting tool was used to blunt the internal peaks originally formed between internal slots, to thereby provide blunted internal peaks 1327 as shown in FIG. 7. Alternative prototype rotors were made in similar manner using a 5-inch diameter cutting tool.

Figure 8:
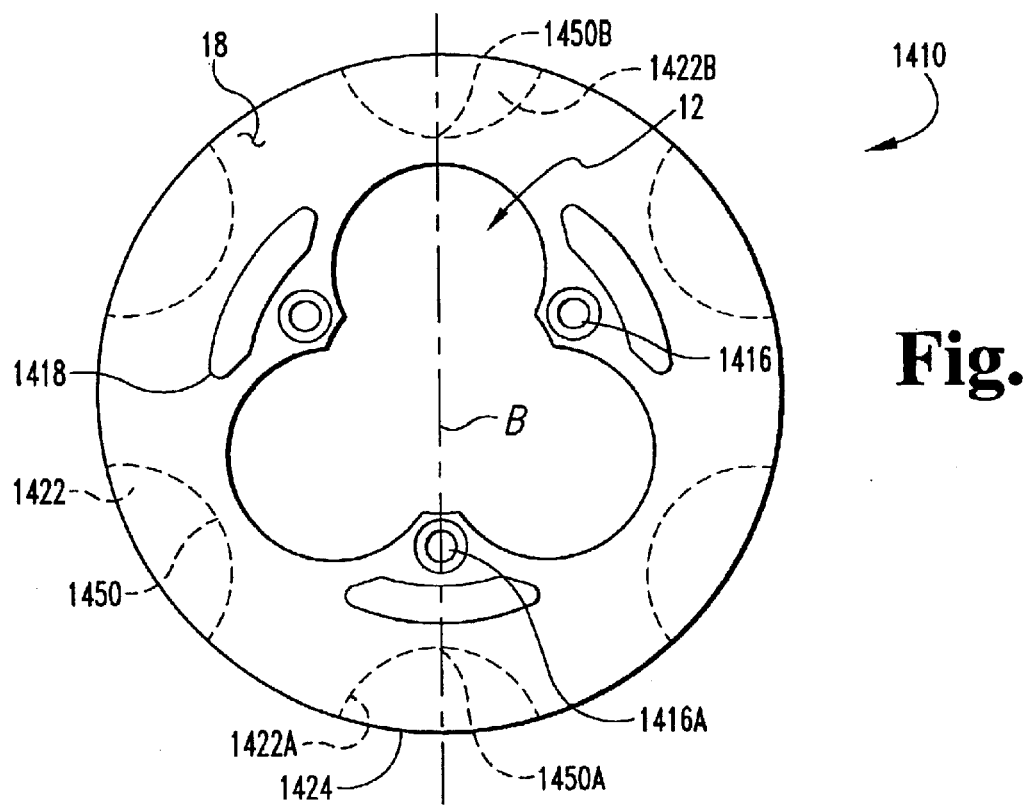
FIG. 8 is a top plan view of a further embodiment of the present invention.

FIG. 8 shows a rotor having three fastener apertures 1416 and six internal slots 1422. Also shown are a plurality of cross drilled holes 1418 cut through the friction surface 18 of the rotor 1410. Surface features such as these and others may optionally be incorporated into rotors having internal slots according to the present invention. This rotor design is suitable for a wheel that carries less of a braking load than an inboard brake (i.e., left-rear brake) of a sprint car. For example, the rotor depicted in FIG. 8 finds advantageous use as a left-front brake of a sprint car. Prototype rotors having the configuration depicted in FIG. 8 were made from an 11 inch diameter aluminum workpiece having a thickness of 0.375 inches. Six internal slots were machined into the workpiece as shown in FIG. 8 to a width of 0.100 inches and a depth of 1.438 inches. A rotor made in this manner weighs about 1.75 pounds.

Figure 9:
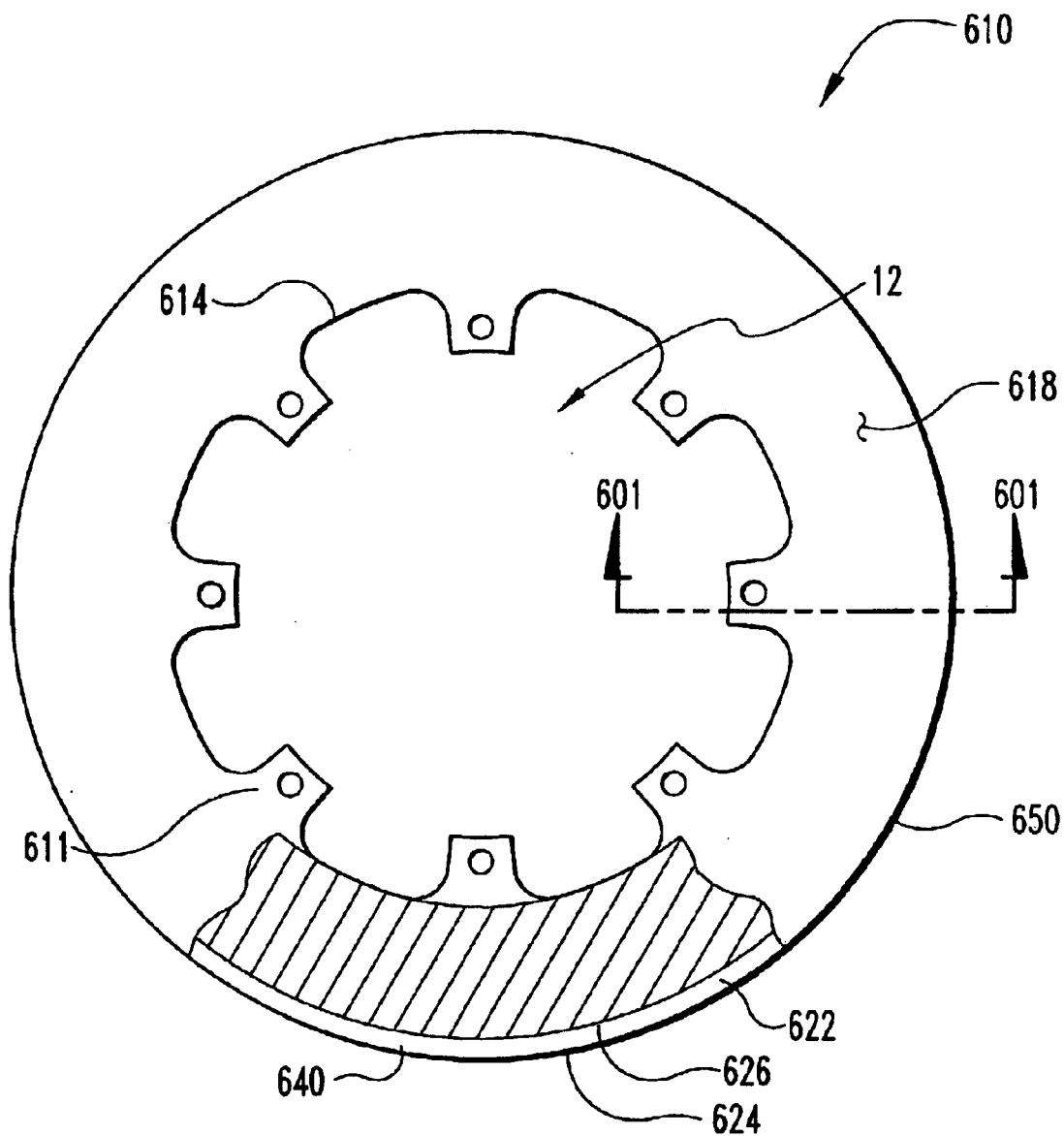
FIG. 9 is a partial sectional, cut away plan view of a brake rotor according still another embodiment of the present invention.
Figure 10:
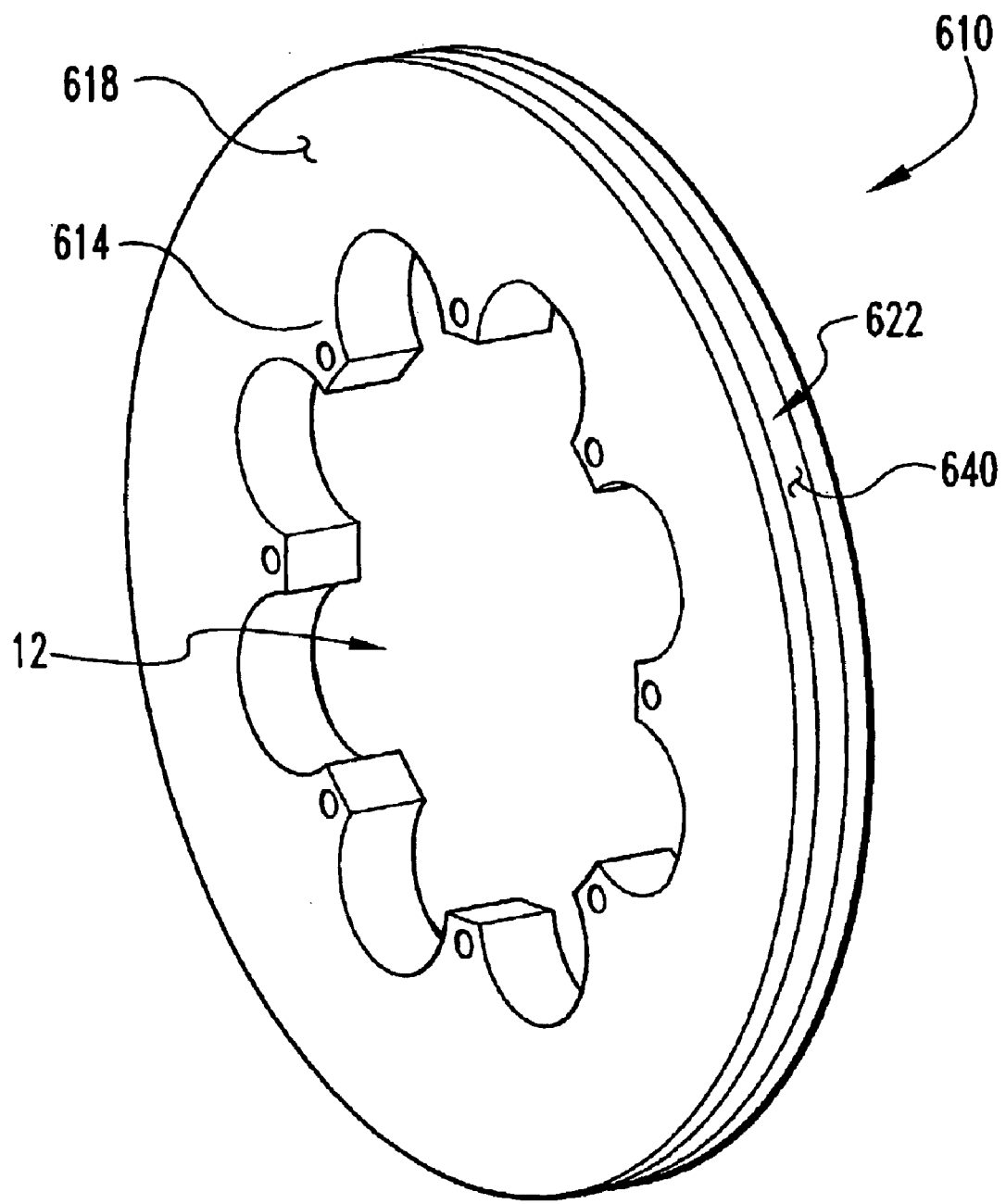
FIG. 10 is a perspective view of the brake rotor of FIG. 9.
Figure 11A:
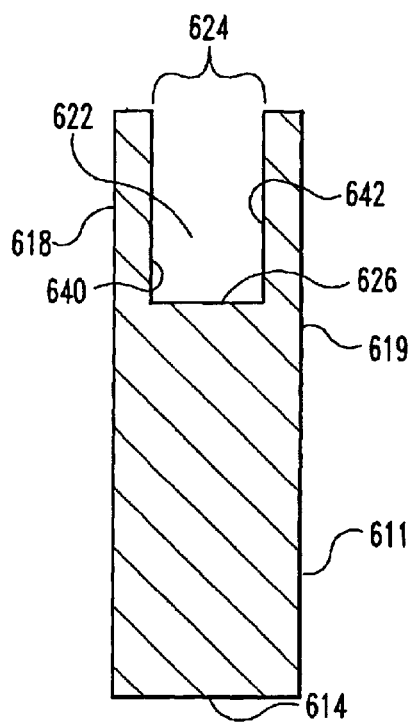
FIG. 11A is a partial cross sectional view of the rotor of FIG. 9 along line 601.
Figure 11B:
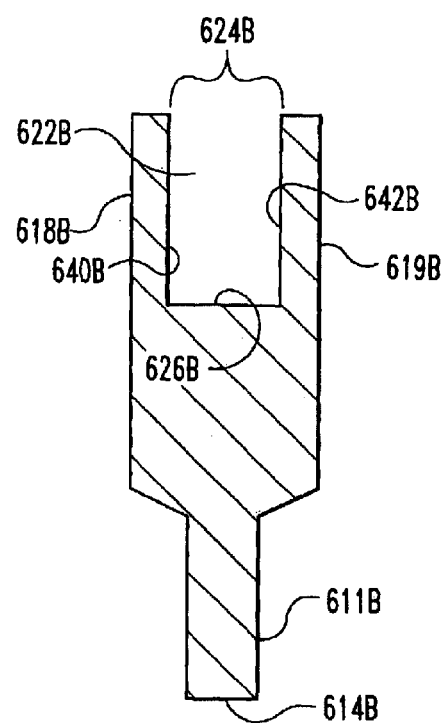
FIG. 11B is a partial cross sectional view of an alternate embodiment of the rotor of FIG. 9 along line 601.
Figure 11C:
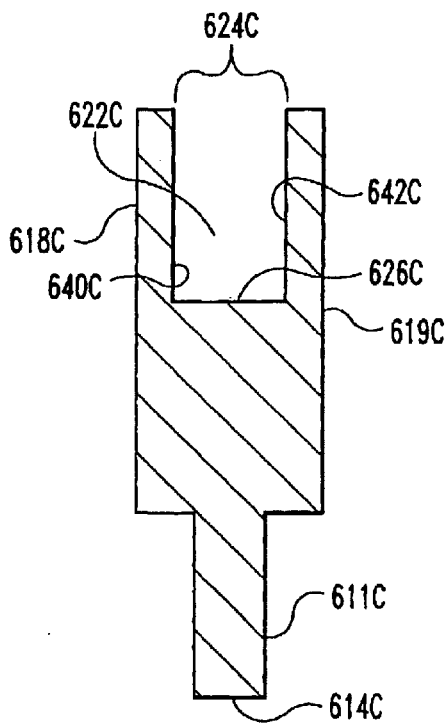
FIG. 11C is a partial cross sectional view of yet another alternate embodiment of the rotor of FIG. 9 along line 601.
Figure 11D:
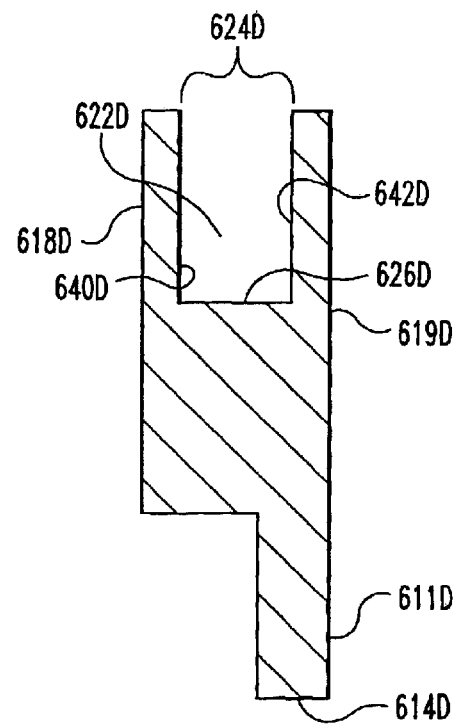
FIG. 11D is a partial cross sectional view of still another alternate embodiment of the rotor of FIG. 9 along line 601.

FIG. 9 shows another alternate embodiment of the present invention. In this embodiment a single internal slot 622 is incorporated into the body of rotor 610 having a central mounting face 611 formed in the inner hub 614 of the rotor. The internal slot is a continuous circumferential groove or channel having an open side 624, an inner wall 626, and two side walls 640, 642. The internal slot 622 is machined into the outer circumferential wall 650 of rotor 610, preferably using a single machining operation as will be described below in greater detail. FIG. 10 shows a perspective view of a rotor according to the embodiment shown in FIG. 9. In this view the side wall 640 of the internal slot 622 is visible. FIG. 11A shows a partial cross-sectional view along line 601 of FIG. 9. This view best illustrates the relationship between the side walls 640, 642, the inner wall 626 and the opening 624 as they define internal slot 622. A partial cross-section of an alternate embodiment of the rotor shown in FIG. 9 taken along line 601 is shown in FIG. 11B. In this embodiment, machining of the hub forms angled surfaces connecting the friction surfaces 618B, 619B to the inner hub 614B of the rotor. This view also shows the relationship between the side walls 640B, 642B, the inner wall 626B and the opening 624B as they define the internal slot 622B. FIG. 11C shows a partial cross-sectional view of yet another embodiment of the rotor shown in FIG. 9 taken along line 601. In this embodiment, alternate machining steps were used to produce the central mounting face 611C of the inner hub 614C. The internal slot 622C is defined by two side walls 640C, 642C, an inner wall 626C and an opening 624C. Yet another alternative embodiment of the rotor shown in FIG. 9 taken along line 601 is shown in FIG. 11D. In this embodiment the hub is machined such that the inner hub 614D is offset with respect to internal slot 622D. The internal slot 622D in this embodiment is defined by two side walls 640D, 642D, an inner wall 626D and an opening 624D. As further alternatives to the embodiment shown in FIG. 11D, alternative machining steps can be used to provide a tapered surface from friction surface 618D to inner hub 614D in a manner similar to the tapered surfaces shown in FIG. 11A.

Figure 12:
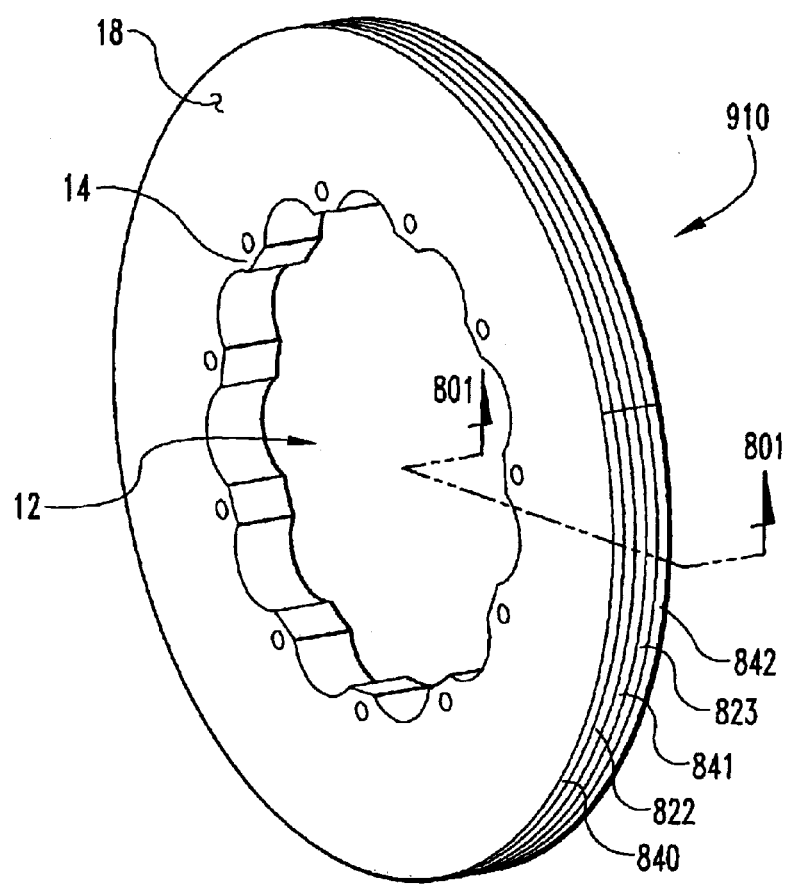
FIG. 12 is a perspective view of an alternate embodiment of the present invention.
Figure 13:
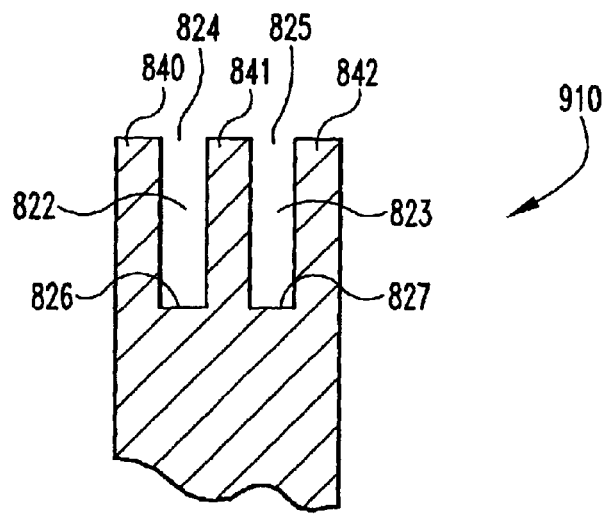
FIG. 13 is a partial cross sectional view of the rotor of FIG. 12 along line 801.

In another embodiment as shown in FIG. 12, two internal slots 822, 823 in the form of two substantially parallel grooves are machined into the outer wall of rotor 910. FIG. 13 shows a partial cross-sectional view along line 801. This view best illustrates the relationship between the side walls, the inner wall 826 and the opening 824 as they define the internal slot 822 and the relationship between the side walls, the inner wall 827 and the opening 825 as they define the internal slot 823. In this embodiment, the rotor is shown as having eleven lugs. Eleven lugs are shown simply as another representative example of a rotor having an alternative number of lugs. It is of course understood that the present invention is not limited by the number of lugs, but rather, finds advantageous use in connection with rotors having a wide variety of different inner hub configurations.

Figure 14:
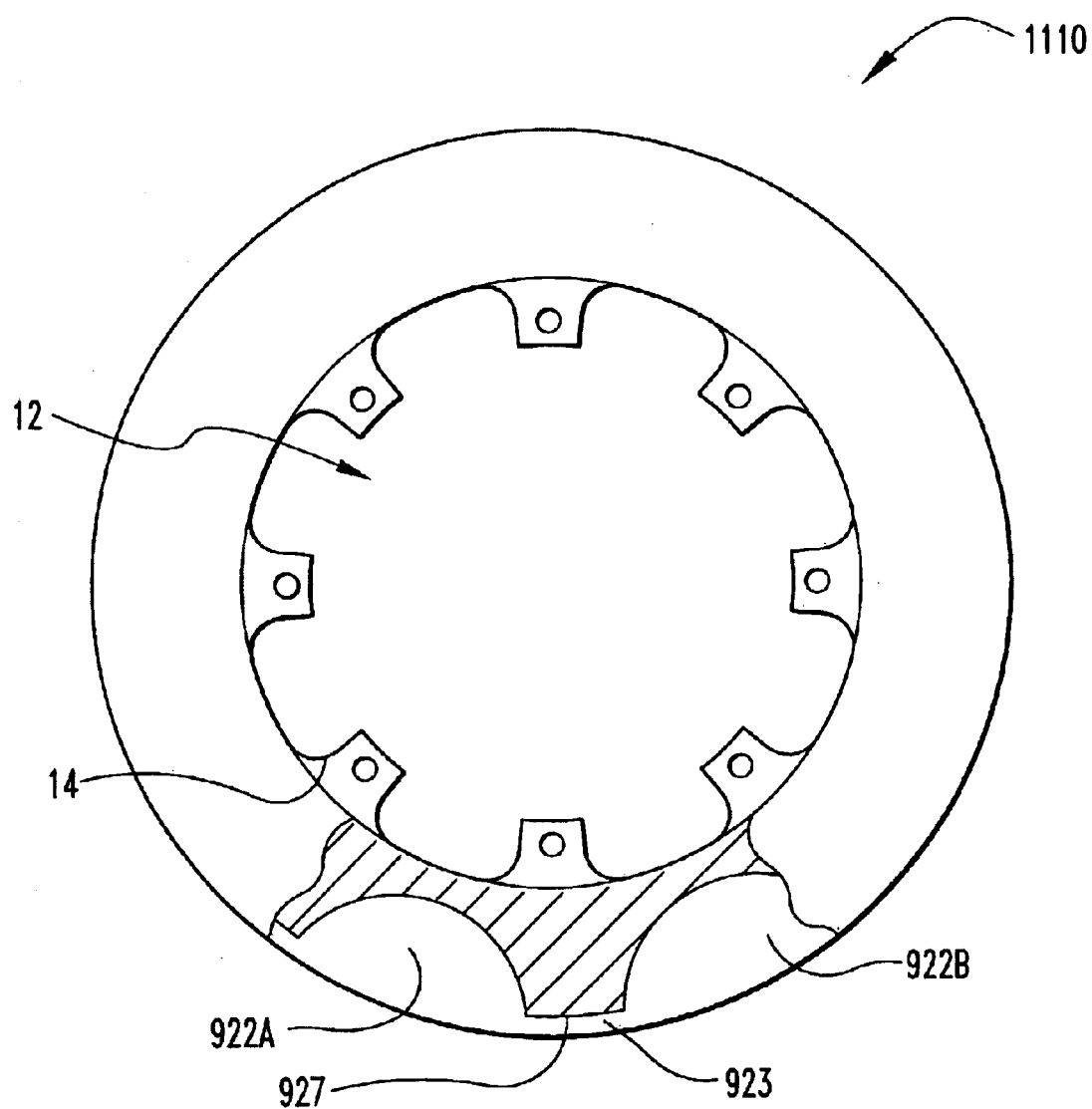
FIG. 14 is a partial sectional, cut away plan view of a brake rotor according to yet a further embodiment of the present invention.

FIG. 14 depicts yet another embodiment of the present invention. In this embodiment, a plurality of segmented-circular internal slots 922A, 922B (two of many shown) are separated by circumferentially spaced apart walls 927 such as those described in FIG. 1. In this embodiment, however, walls 927 are positioned internally, and a circumferential groove 923 such as that shown in FIG. 9 is included. Thus, in this embodiment, segmented-circular features and a circumferential groove are incorporated into a single rotor 1110.

Figure 15:
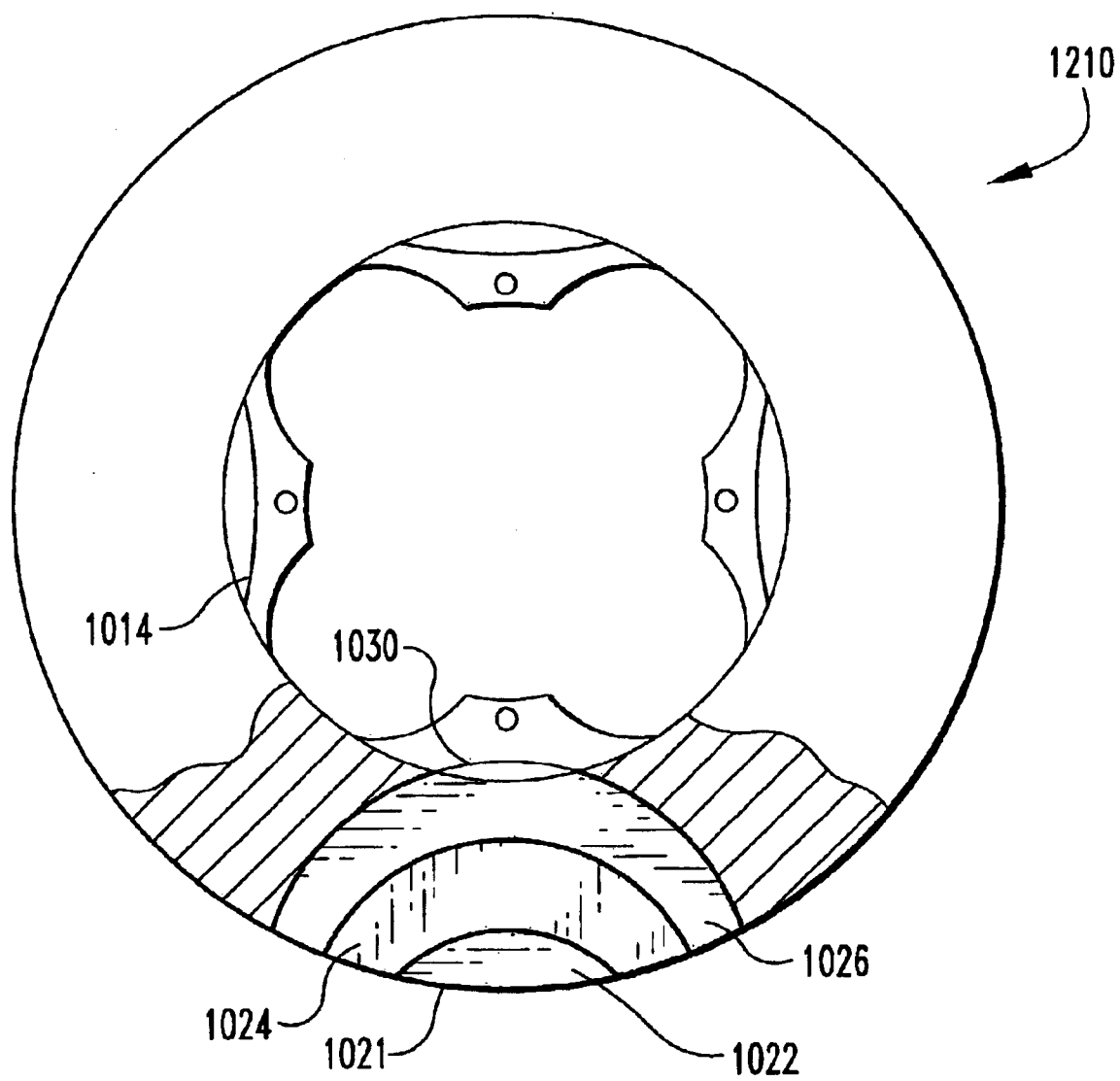
FIG. 15 is a partial sectional, cut away plan view of a brake rotor according an still a further embodiment of the present invention.

FIG. 15 shows a rotor 1210 having a plurality of internal slots 1022 (one of many shown) having three concentric segmented-circular portions 1021, 1024, 1026 of differing dimensions. In this particular embodiment a portion 1030 of the internal slots 1022 extends into a portion of the lug 1014 of the rotor 1210. The width of the slot decreases as the depth of the slot increases. In this example, the first section of the slot 1021 has a first width proximal to the outer circumferential wall of rotor 1210 which is greater than the width of the second section of the channel 1024 which is greater than the width of the third section of the channel 1026 distal from the outer wall of rotor 1210.

Figure 16:
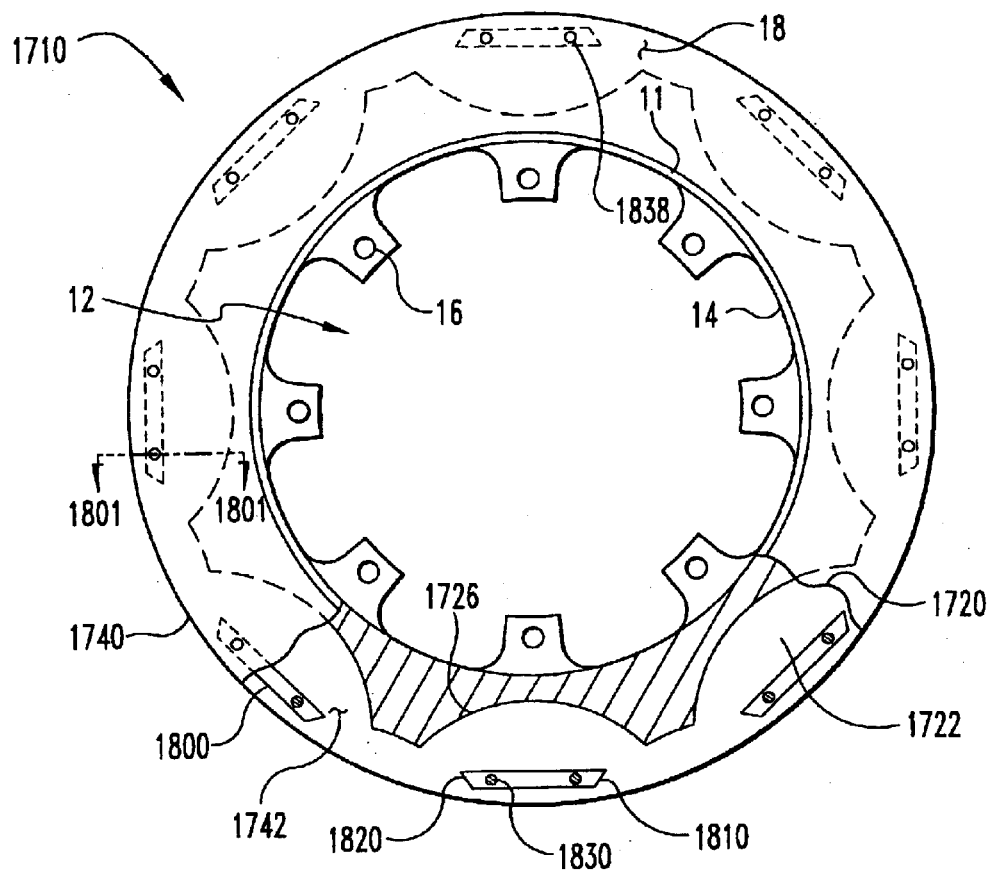
FIG. 16 is a partial sectional, cut away plan view of a brake rotor according to yet another embodiment of the present invention.

FIG. 16 shows a partial cross-sectional plan view of yet another embodiment of the present invention having a partial cut away section 1720. In this embodiment, a rotor 1710 similar to that shown in FIG. 7 includes eight internal slots 1722 aligned with eight fastener apertures 16 as previously described. This embodiment further includes eight support members 1800 or shims disposed between the first side wall 1740 and the second side wall 1742, which together with the inner wall 1726 and the opening 1724 define the internal slots 1722. Shims 1800 provide structural support to the slots, which increases the strength of the internal slots and improves the slots' resistance to the compressive forces generated by the clamping action of frictional members such as brake pads as previously described.

In the example shown in FIG. 16, each shim 1800 is held in place by two pins 1830. Each pin passes through a cross-drilled hole 1838 formed through each friction surface 18, 19 of the rotor 1710 and through a cross-drilled hole 1835, 1836 passing through the shim 1800. Each shim is shown as being secured by two pins although a greater or lesser number of pins or an alternative manner of securing shims may alternatively be used. Preferably the pins 1830 are made from a sold piece of material such as brass or copper which is softer than the material of the rotor 1710. In other embodiments, the pins are made from the same material from which the rotor is made, or from a harder material. In one embodiment the pins are 0.0938 inches in diameter although pins of greater or lesser diameter may also be used.

Figure 17:
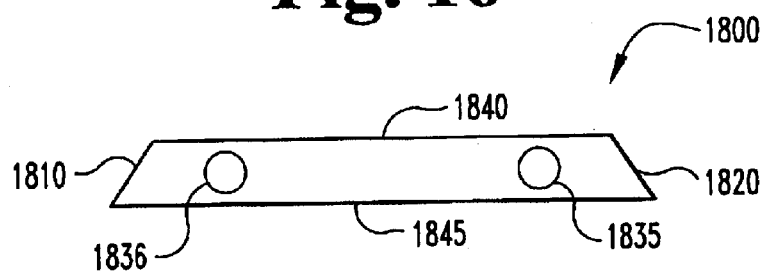
FIG. 17 is a plan view of a shim according to one embodiment of the present invention.
Figure 18:
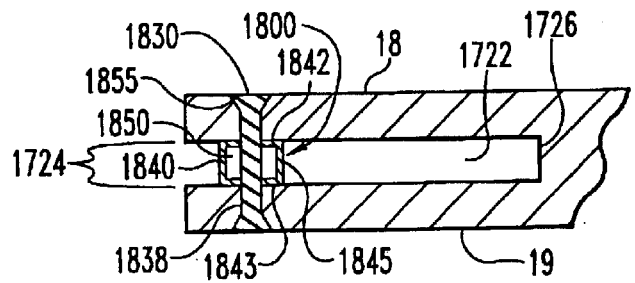
FIG. 18 is a partial cross sectional view of the rotor of FIG. 16 along line 1801.

FIG. 17 shows a plan view of a shim 1800 according to one embodiment of the present invention. The shim has a top side 1840 and a bottom side 1845 separated by a first side wall 1842 and a second side wall 1843 (as shown in FIG. 18). In this particular embodiment the top side 1840 is shorter than the bottom side 1845. The present invention also contemplates the use of shims of different shapes and sizes. The shim 1800 includes two cross-drilled holes 1835, 1836 through which securing pins are passed as previously described.

FIG. 18 is a partial cross sectional view along line 1801 of rotor 1710 showing the positioning of the shim 1800 within the internal slot 1722. Preferably each end 1855 of the cross-drilled pin hole 1838 proximal to a friction surface 18, 19 is slightly beveled. Beveling allows the securing pin 1830 to be ground or pressed flush with the friction surfaces 18, 19 of the rotor 1710 thereby preventing the pins from damaging brake pads during the braking operation when the surface of the pads is in contact with the friction surfaces 18, 19. Beveling also produces a more secure fit of the pin 1830 within the pin hole 1838. In this particular example the shim 1800 has a hollow center 1850 although solid shims may also be used. In one preferred embodiment the shims are made of softer materials such as copper or brass although the present invention also contemplates the use of shims made of harder materials.

In the embodiment shown in FIG. 16, each shim is positioned in an internal slot such that the ends 1810, 1820 are equidistant from the slot opening. As an alternative to the shim positions shown in the embodiment of FIG. 16, a shim can be oriented such that its ends are not equidistant from the slot opening. For example, in one orientation contemplated by the invention, each shim has a leading end and a trailing end corresponding to the direction of rotation of the rotor, and the leading end of each shim is positioned closer to the circumferential internal slot opening 1724 than the trailing end of the shim 1820. As another possibility, the shim can be inverted such that a longer side (i.e., side 45 in FIG. 17) is closer to the slot open than the shorter end. One or both of these orientations are believed to allow the shim to act as a "scoop," forcing airflow into the internal slots as the rotor 1710 is rotated, thereby improving cooling of the rotor by thermal convection.

Alternative embodiments are also contemplated in which the trailing end is nearer the slot opening than the leading end to deflect airflow from the internal slot. In further embodiments of the invention support members are included that have minimal or no effect on the flow of air through the internal slots during operation of the rotor. Support members used in accordance with the invention can have a wide variety of configurations, and it is not intended that the invention be limited to any particular shape.

In alternate embodiments of the invention (not shown), the centers of the internal slots are not aligned with the centers of fastener apertures. The lack of alignment, or symmetry, between the fastener apertures and internal slots is not preferred in the practice of some forms of the invention because the lack of alignment reduces the depth to which an internal slot can be machined without unacceptably weakening the structure of the rotor, i.e., decreasing the overall structural integrity necessary for the rotor to function properly under normal operating conditions. Nevertheless, a rotor having internal slots as described herein has advantageous properties even absent maximization of slot depth, and the invention therefore also contemplates rotors having internal slots that are not aligned with the lugs.

Rotors according to the present invention are advantageously manufactured from a unitary piece of starting material. One preferred manner of manufacturing rotors in accordance with the invention is described herein. It is of course understood that various details of the described process can be eliminated or modified without departing from the spirit of the invention. The material can be selected from a wide variety of metals, metal alloys or composites suitable for use as a brake rotor. In various preferred embodiments, the rotor is made from steel alloys, titanium, aluminum or other machinable alloys or materials. Rotors made from billets of these materials can be configured to possess various advantageous combinations of desirable properties including weight, cooling properties and strength. For example, aluminum is lightweight and has high thermal conductivity but typically requires increased structural dimensions to achieve suitable strength, especially at high operating temperatures. Titanium has greater strength than aluminum, thus, smaller dimensions are typically suitable for achieving desired strength. Stainless steel has high strength and moderately high thermal conductivity, thus allowing for smaller structural dimensions and larger internal slots; however, because steel is much heavier than aluminum and titanium, efforts are made to avoid the use of steel in racing applications. The method used to produce the starting billet of material varies according to the type of material used. Typical production methods include mechanical cutting, plasma cutting, water-jet cutting, laser cutting and perhaps stamping.

Once a starting billet of material of the desired size and shape is produced, an inner hub having a mounting face for mounting the rotor on a drive shaft or axle is machined into the center of the rotor using known machining techniques. This machining produces a central aperture through which an axle may be received and a plurality of fastener apertures through which fasteners such as bolts may pass to later fasten the finished rotor to an axle or drive shaft. The inner hub, mounting face and lug can have a wide variety of configurations, some preferred embodiments of which are described in detail above and shown in the drawings. The machining of a central aperture and mounting face into the starting billet produces a rotor workpiece into which slots may be machined according to the methods of the present invention.

Rotors incorporating internal slots according to the present invention may be machined using standard cutting and machining equipment known in the industry. Preferably the desired internal slots are machined using a rotary cutting blade. Other cutting tools are also contemplated by the invention, and it is not intended that the invention be limited by the choice of cutting tool. For example, although not presently considered to be the preferred cutting tool for the practice of the invention, a cutting wheel could optionally be used to achieve the advantageous result of the invention. To produce segmented-circular shaped internal slots as described in FIGS. 1-2, the cutting blade is inserted to the desired depth in the outer circumferential wall of the rotor workpiece and then withdrawn. Optionally, the cutting blade can be repeatedly inserted and withdrawn to incrementally increasing depths until a slot of the desired depth is produced.

Once the first slot is cut, the cutting blade is withdrawn and the rotor workpiece rotated relative to the cutting blade. The exact distance the workpiece is rotated depends on the size of the cutting blade being used and the size, shape and number of internal slots desired in the final rotor. Preferably the rotor is rotated sufficiently so that once cut, the center of the slot aligns with the center of a fastener aperture. Also, preferably, the rotor is rotated sufficiently such that the final slots are equally spaced about the circumference of the outer wall of the finished rotor. As an alternative to rotating the rotor workpiece as described above, the cutting blade can be circumferentially rotated about a stationery workpiece or a rotating workpiece. Once all the desired internal slots have been cut, the rotor may be removed from the cutting machine and optionally polished or resurfaced to a final finish as desired.

In one embodiment, the machining of the internal slots is controlled by a computer-controlled programmable cutting machine to ensure consistent and accurate spacing and depth of the finished slots. To produce a rotor with internal slots such as those shown in FIG. 15, cutting blades of increasing width are inserted to decreasing depth so as to produce a slot having a width that decreases as the groove depth increases.

Production of an internal slot such as the continuous grooves described in FIGS. 9-11 is accomplished by inserting a cutting blade to the desired depth into the outer circumferential wall of the rotor workpiece and the workpiece is rotated until a continuous groove is cut about the circumference of outer wall of the rotor. Optionally the cutting blade may be inserted to a depth less than the final desired depth and the rotor workpiece rotated so as to cut a circumferential groove shallower than the final desired depth. The blade may then be inserted to a greater depth and a deeper groove cut until the final desired depth groove is produced. This allows a deep slot to be cut in increments. Alternatively, the cutting blade may be circumferentially rotated about a stationery workpiece or a rotating workpiece. In another embodiment, a second, substantially parallel groove may be machined in the outer wall of the rotor to produce a rotor having two grooves as shown in FIGS. 12-13. Optionally, two substantially parallel grooves may be machined in the outer wall of the rotor to produce a rotor such as shown in FIGS. 12-13 using two substantially parallel cutting blades to machine the grooves simultaneously or by machining the slots separately. Once the desired channels have been cut the rotor may be removed from the cutting machine and optionally polished or resurfaced to a final finish as desired.

A rotor made in accordance with the invention may also optionally include surface features such as surface slots or cross-drilled holes on the outer frictional surface of the disk. As discussed above, such features can be included to further reduce the weight of a rotor and to provide additional cooling of the rotor during use; however, such features also reduce the efficiency of a rotor by reducing the overall surface area available for contact with a brake pad or other similar component. Such surface features can be machined into the friction surface at any convenient time during the rotor fabrication process. For example, such surface features can be machined after the inner hub has been machined into the starting billet. Alternatively, surface features can be machined after internal slots have been machined as described above.

As will be appreciated by a person of ordinary skill in the art in view of the present description, one form of the present invention is a method of producing an internally slotted brake rotor. The method includes: (1) providing an annular rotor workpiece with an outer circumferential boundary; (2) providing a machining tool having a cutting blade; (3) inserting said cutting blade into the outer circumferential boundary of said rotor workpiece; and (4) withdrawing said cutting blade from said rotor workpiece.

In one preferred manner of practicing the invention, the method includes, after withdrawing the cutting blade, rotating the rotor workpiece relative to the cutting blade a first predetermined distance and repeating the inserting and withdrawing. In methods for making rotors having more than two internal slots, the rotating, inserting and withdrawing are repeated a predetermined number of times to provide an internally slotted brake rotor having a predetermined number of circumferential internal slots.

In another manner of practicing the invention, the method includes, after withdrawing the cutting blade, rotating said cutting blade circumferentially relative to the rotor workpiece a first predetermined distance and repeating the inserting and withdrawing. In methods for making rotors having more than two internal slots, the rotating, inserting and withdrawing are repeated a predetermined number of times to provide an internally slotted brake rotor having a predetermined number of circumferential internal slots.

In yet another manner of practicing the invention, the method includes, after inserting and before withdrawing the cutting blade, rotating the rotor workpiece relative to the cutting blade a first predetermined distance. In one preferred method, the first predetermined distance is at least 360° of rotation. In another preferred method, the first predetermined distance is less than 360° of rotation. Another inventive method includes, after inserting and before withdrawing the cutting blade, rotating the cutting blade circumferentially relative to the rotor workpiece a first predetermined distance. In one preferred method, the first predetermined distance is at least 360° of rotation. In another preferred method, the first predetermined distance is less than 360° of rotation.

In another aspect of the invention, there is provided an internally slotted brake rotor. The rotor comprises an annular inner hub including a central mounting face, an outer circumferential wall, and at least one internal slot machined into the outer circumferential wall. The internal slot is defined by an inner wall, a first side wall and a second side wall, which are formed integrally with the outer wall.

In one embodiment, the rotor comprises a plurality of segmented-circular slots opening to the outer circumferential wall of the rotor. In still another embodiment, the plurality of segmented-circular slots are equally spaced about the circumference of the outer wall. In yet another embodiment, the plurality of segmented-circular slots are oriented to provide alignment between the slots and fastener apertures in said inner hub. In a further embodiment, the plurality of segmented-circular channels have at least one side open to the inner hub.

In another embodiment, the rotor comprises a first groove having a substantially continuous depth about the circumference of the outer circumferential wall. In another embodiment, the rotor further comprises a second groove having a substantially continuous depth about the circumference of the outer circumferential wall and being substantially parallel to the first groove.

A person of ordinary skill in the art will appreciate that a number of modifications and refinements to the above-described methods can be made to provide the advantageous results of the invention, as described in detail above. While the invention has been illustrated and described in detail in the drawings and foregoing description, the same is to be considered as illustrative and not restrictive in character, it being understood that only the preferred embodiments have been shown and described and that all changes, modifications and equivalents that come within the spirit of the inventions disclosed herein and defined by the following claims are desired to be protected. The articles "a", "an", "said" and "the" are not limited to a singular element, and include one or more such element.

What is claimed is:

1. A method of producing an internally slotted brake rotor comprising:
   providing an annular rotor workpiece with an outer circumferential boundary;
   providing a machining tool having a cutting blade;
   inserting said cutting blade into the outer circumferential boundary of said rotor workpiece to cut an internal slot into the workpiece, wherein the internal slot opens toward the outer circumferential boundary; and
   withdrawing said cutting blade from said rotor workpiece.

2. The method of claim 1 wherein the cutting blade is a rotary cutting blade.

3. The method of claim 1, further comprising, after said withdrawing, rotating the rotor workpiece relative to the cutting blade a first predetermined distance and repeating said inserting and said withdrawing.

4. The method of claim 3, wherein said rotating inserting and withdrawing are repeated a predetermined number of times to provide an internally slotted brake rotor having a predetermined number of circumferential internal slots.

5. The method of claim 1, further comprising, after said withdrawing, rotating the cutting blade circumferentially relative to the rotor workpiece a first predetermined distance and repeating said inserting and said withdrawing.

6. The method of claim 5, wherein said rotating inserting and withdrawing are repeated a predetermined number of times to provide an internally slotted brake rotor having a predetermined number of circumferential internal slots.

7. The method of claim 1, further comprising, after said inserting and before said withdrawing, rotating the rotor workpiece relative to the cutting blade a first predetermined distance.

8. The method of claim 7 wherein the first predetermined distance is at least 360° of rotation.

9. The method of claim 7 wherein the first predetermined distance is less than 360° of rotation.

10. The method of claim 1, further comprising, after said inserting and before said withdrawing, rotating the cutting blade circumferentially relative to the rotor workpiece a first predetermined distance.

11. The method of claim 10 wherein the first predetermined distance is at least 360° of rotation.

12. The method of claim 10 wherein the first predetermined distance is less than 360° of rotation.

13. The method of claim 1 wherein, after said inserting, the rotor workpiece comprises an outer circumferential wall and at least one internal slot machined into said outer circumferential wall, said internal slot defined by an inner wall, a first side wall and a second side wall; wherein said inner wall, said first side wall and said second side wall are formed integrally with said outer wall.

14. The method of claim 3 wherein, after said repeating, the rotor workpiece comprises an outer circumferential wall and at least two internal slots machined into said outer circumferential wall, each of said internal slots defined by an inner wall, a first side wall and a second side wall; and wherein said slots are segmented-circular slots opening to the outer circumferential wall.

15. The method of claim 4 wherein, after said repeating, the rotor workpiece comprises an outer circumferential wall and at least three internal slots machined into said outer circumferential wall, each of said internal slots defined by an inner wall, a first side wall and a second side wall; and wherein said slots are segmented-circular slots opening to the outer circumferential wall.

16. The method of claim 15 wherein said segmented-circular slots are equally spaced about the circumference of said outer wall.

17. The method of claim 15 wherein an annular inner hub including a central mounting face defining fastener apertures is machined into said workpiece; and wherein said segmented-circular slots are oriented to provide alignment between the slots and fastener apertures in said inner hub.

18. The method of claim 5 wherein, after said repeating, the rotor workpiece comprises an outer circumferential wall and at least two internal slots machined into said outer circumferential wall, each of said internal slots defined by an inner wall, a first side wall and a second side wall; and wherein said slots are segmented-circular slots opening to the outer circumferential wall.

19. The method of claim 6 wherein, after said repeating, the rotor workpiece comprises an outer circumferential wall and at least three internal slots machined into said outer circumferential wall, each of said internal slots defined by an inner wall, a first side wall and a second side wall; and wherein said slots are segmented-circular slots opening to the outer circumferential wall.

20. The method of claim 19 wherein said segmented-circular slots are equally spaced about the circumference of said outer wall.

21. The method of claim 19 wherein an annular inner hub including a central mounting face defining fastener apertures is machined into said workpiece; and wherein said segmented-circular slots are oriented to provide alignment between the slots and fastener apertures in said inner hub.

22. The method of claim 7 wherein, after said rotating, the rotor workpiece comprises an outer circumferential wall and at least one internal slot machined into said outer circumferential wall, said internal slot defined by an inner wall, a first side wall and a second side wall; wherein said inner wall, said first side wall and said second side wall are formed integrally with said outer wall.

23. The method of claim 22 wherein, after said rotating, said internal slot has a substantially continuous depth about the circumference of said outer circumferential wall.

24. The method of claim 23, further comprising repeating said inserting, rotating and withdrawing; wherein, after said repeating, said workpiece further comprises a second internal slot having a substantially continuous depth about the circumference of said outer circumferential wall and being substantially parallel to said first internal slot.

25. A method of producing an internally slotted brake rotor comprising:
   providing an annular brake rotor workpiece having two opposing friction surfaces and having an outer circumferential boundary;
   providing a machining tool having a cutting blade;
   inserting said cutting blade into the outer circumferential boundary of said rotor workpiece to cut an internal slot into the workpiece between the friction surfaces; and
   withdrawing said cutting blade from said rotor workpiece to provide an internally slotted brake rotor.

26. The method of claim 25, wherein the brake rotor workpiece is a unitary brake rotor workpiece.